US009300640B2

(12) United States Patent
Pate

(10) Patent No.: US 9,300,640 B2
(45) Date of Patent: *Mar. 29, 2016

(54) SECURE VIRTUAL MACHINE

(71) Applicant: HyTrust, Inc., Mountain View, CA (US)

(72) Inventor: Stephen D. Pate, El Dorado Hills, CA (US)

(73) Assignee: HyTrust, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/040,658

(22) Filed: Sep. 28, 2013

(65) Prior Publication Data

US 2015/0019864 A1 Jan. 15, 2015

Related U.S. Application Data

(63) Continuation of application No. 13/069,736, filed on Mar. 23, 2011, now Pat. No. 8,555,377.

(60) Provisional application No. 61/329,236, filed on Apr. 29, 2010.

(51) Int. Cl.
*H04L 29/06* (2006.01)
*G06F 9/455* (2006.01)
*G06F 21/53* (2013.01)

(52) U.S. Cl.
CPC ........ *H04L 63/0428* (2013.01); *G06F 9/45558* (2013.01); *G06F 21/53* (2013.01); *H04L 63/083* (2013.01); *G06F 2221/2149* (2013.01); *H04L 63/102* (2013.01)

(58) Field of Classification Search
CPC .............. H04L 63/0428; H04L 63/083; G06F 9/45558
See application file for complete search history.

(56) References Cited

U.S. PATENT DOCUMENTS

| 7,523,149 | B1* | 4/2009 | Sridharan | G06F 11/1456 |
| 7,757,269 | B1* | 7/2010 | Roy-Chowdhury | G06F 8/71 |
| | | | | 726/1 |
| 7,870,153 | B2* | 1/2011 | Croft et al. | 707/781 |
| 8,209,288 | B2* | 6/2012 | Friedman et al. | 707/638 |
| 8,234,640 | B1* | 7/2012 | Fitzgerald | G06F 21/53 |
| | | | | 718/1 |
| 8,307,443 | B2* | 11/2012 | Wang et al. | 726/24 |
| 8,326,803 | B1* | 12/2012 | Stringham | G06F 3/067 |
| | | | | 707/652 |
| 2007/0180448 | A1* | 8/2007 | Low | G06F 3/1315 |
| | | | | 718/1 |

(Continued)

OTHER PUBLICATIONS

International Search Report and Written Opinion, issued by the International Searching Authority (mailed May 31, 2011), for International Application No. PCT/US11/30078 (filed Mar. 25, 2011), 7 pgs.

*Primary Examiner* — Tae Kim
*Assistant Examiner* — Shu Chun Gao
(74) *Attorney, Agent, or Firm* — Ascenda Law Group, PC

(57) ABSTRACT

An approach to securely distributing and running virtual machines is described that addresses the inherent insecurity of mobile virtual machines by authenticating a user before establishing a specialized virtualization runtime environment that includes a filesystem driver inserted into the host operating system to provide secure access to a virtual machine by authorized hypervisors only. Further described is the creation of a SecureVM package that includes the various components used to perform the operations of installation, user authentication and establishment of the specialized virtualization runtime environment.

9 Claims, 4 Drawing Sheets

(56) References Cited

U.S. PATENT DOCUMENTS

| | | |
|---|---|---|
| 2007/0192329 A1 | 8/2007 | Croft et al. |
| 2008/0134176 A1* | 6/2008 | Fitzgerald et al. ............... 718/1 |
| 2008/0215796 A1* | 9/2008 | Lam et al. ..................... 711/100 |
| 2008/0307409 A1* | 12/2008 | Lu et al. ........................ 717/174 |
| 2009/0249283 A1 | 10/2009 | Bourdon |
| 2009/0282266 A1 | 11/2009 | Fries et al. |
| 2009/0287571 A1 | 11/2009 | Fujioka |
| 2010/0100746 A1 | 4/2010 | Grove et al. |
| 2010/0169948 A1* | 7/2010 | Budko ............... G06F 21/53 726/1 |
| 2011/0154023 A1* | 6/2011 | Smith et al. ................... 713/155 |

\* cited by examiner

SECURE VIRTUAL MACHINE

CROSS-REFERENCE TO RELATED APPLICATIONS

This application claims the benefit of U.S. Provisional Patent Application No. 61/329,236 filed on Apr. 29, 2010 and entitled "SecureVM—Securing Mobile Virtual Machines," which is incorporated herein by reference in its entirety. This application is also a continuation of U.S. patent application Ser. No. 13/069,736 filed on Mar. 23, 2011 (now issued as U.S. Pat. No. 8,555,377).

BACKGROUND OF THE INVENTION

1. Field of the Invention

The present invention relates generally to the running of operating system virtual machines and more particularly to maintaining their security when distributing them to and running them on various computing system (machines) and operating environments.

2. Description of the Prior Art

Operating system (OS) virtualization is a technology that allows multiple operating systems to share the same physical machine. For example, Windows, the operating system from Microsoft of Redmond, Wash., and Linux, an open source operating system, could be running side by side on the same physical machine yet be completely unaware of the presence of each other. The software that provides this virtualization capability is known as a hypervisor and an operating system being run by a hypervisor is known as a guest operating system ("guest OS"). The hypervisor software creates a "virtual machine" for each guest OS and, as such, the terms guest OS and virtual machine are often used interchangeably.

Operating system virtualization is not new technology. IBM of Armonk, N.Y. developed virtualization solutions in the 1960s as a means to partition mainframe computer resources to help organizations reduce costs. Operating system virtualization started to become more common in the 2000s when VMware of Palo Alto, Calif. introduced their first solutions for the Intel of Santa Clara, Calif. x86-based platforms, the base microprocessor commonly used in desktop and notebook computers.

VMware created a flexible platform that allowed a virtual machine to be created on one type of computer and run on another without requiring any changes to the virtual machine. For example, referring now to FIG. 1, shown on the left is a first computer 109 which may be, for example, a server computer from Dell Computer of Round Rock, Tex. running the Windows 7 operating system from Microsoft as a host operating system 107. Guest operating system 101 is shown supported by a hypervisor 103 in order to run under host operating system 107 and to provide isolation between guest operating system 101 and any other guest operating system which may simultaneously be run on computer 109. Also shown coupled to computer 109 are Virtual Machine ("VM") files 111 which are the files hypervisor 103 accesses via a filesystem 105 of host operating system 107 in order to startup and run guest operating system 101. VM files 111 are the files that comprise a virtual machine and typically include configuration information required to run the virtual machine together with a set of files that correspond to the storage disks of the operating system.

It is possible to take guest operating system 101 running on one machine, for example computer 109, and move it over to and run it on a different machine, for example computer 119 as shown on the right in the figure, which may be, for example, a notebook computer running the Mac OS/X operating system both from Apple of Cupertino, Calif. As depicted in the figure, guest operating system 101 has been moved from computer 109 to computer 119 so that it is now running under hypervisor 113 and host operating system 117 of computer 119 which may be completely different than hypervisor 103 and host operating system 107 of computer 109 due to the differences in operating system and machine environments yet it still operates the same.

As is known in the art, what actually occurs when moving a guest operating system from one computer to another is a process of copying the virtual machine files, again comprising a directory of files on disk, etc., from one machine to another for example by moving Virtual Machine files 111 from computer 109 to computer 119 as shown in the figure.

This flexibility in being able to move a guest operating system from one computer to another, while beneficial in many respects, has its downsides. Because of the low cost and small physical size of modern storage technologies and the commonplace use today of the same processor technology in both corporate data centers and at home, it has become very easy to steal such virtual machines. For example, today a virtual machine running highly confidential payroll or a human resources (HR) database can easily be copied onto a portable storage device and later run on a standard desktop computer at home. VMware even allows the downloading of a free copy of the hypervisor software and support tools to run and analyze these virtual machines.

Yet there remains a legitimate need to be able to move a virtual machine from one machine to another and run it when needed, for all the reasons virtualization was originally developed and has continued to be used today.

What is needed, therefore, is a way to ensure that virtual machine files can still be easily distributed and used on other computers in the case of authorized uses yet be prevented in the case of unauthorized uses.

SUMMARY

In one example is a method for securely running a virtual machine on a computer, the method comprising: establishing a host runtime environment on the computer using a host runtime component of a secure virtual machine package; presenting to a user of the computer a choice of at least one virtual machine of the secure virtual machine package; receiving a selection from the user of the computer of one of the at least one virtual machine of the secure virtual machine package; accessing encrypted meta-data from the secure virtual machine package to obtain a security policy; authenticating the user of the computer according to the obtained security policy; establishing a virtual machine runtime environment on the computer including inserting a secure filesystem into a host operating system of the computer; and accessing encrypted virtual machine files of the user selected virtual machine of the secure virtual machine package via the secure filesystem for an authorized hypervisor of the host operating system.

In another example is a method of creating an installable secure virtual machine package for securely distributing and running a virtual machine, the method comprising: storing a host runtime component in the installable secure virtual machine package; storing a virtual machine runtime component in the installable secure virtual machine package; encrypting a set of virtual machine files using a set of encryption keys and storing the encrypted virtual machine files in the installable secure virtual machine package; encrypting the set of encryption keys and storing the encrypted set of encrypted keys in the installable secure virtual machine package; encrypting a user authentication policy and storing the encrypted user authentication policy in the installable secure virtual machine package; and storing guest operating specific installation and configuration scripts in the installable secure virtual machine package.

DETAILED DESCRIPTION OF THE INVENTION

In various embodiments are provided methods and systems for securely distributing and running a virtual machine as will be described. In various embodiments, the virtual machine files are encrypted to create a protected virtual machine. The encrypted virtual machine files are distributed with software programs that provide secure access to and interoperability with the encrypted virtual machine files. Collectively, the encrypted virtual machine files and the additional software programs are referred to herein as a "SecureVM package." When installed on a computer on which the virtual machine will be run, a software program that is part of the SecureVM package is run to validate the user and/or the computer on which the virtual machine will be run before allowing access to the encrypted virtual machine files. A SecureVM filesystem (SecureVM FS), a software module that is also part of the SecureVM package, is then installed in the host operating system kernel to act as an intermediary between the hypervisor and the host operating system file system to decrypt the encrypted virtual machine files (as well as encrypt whatever is written back to the virtual machine files) thereby allowing access to the encrypted virtual machine files. In this way, properly authorized users are allowed the same access rights and abilities as with any other non-secure virtual machine yet other users are prevented from accessing the encrypted virtual machine files as are other hypervisors and applications as will be explained more fully herein.

Figure 2:
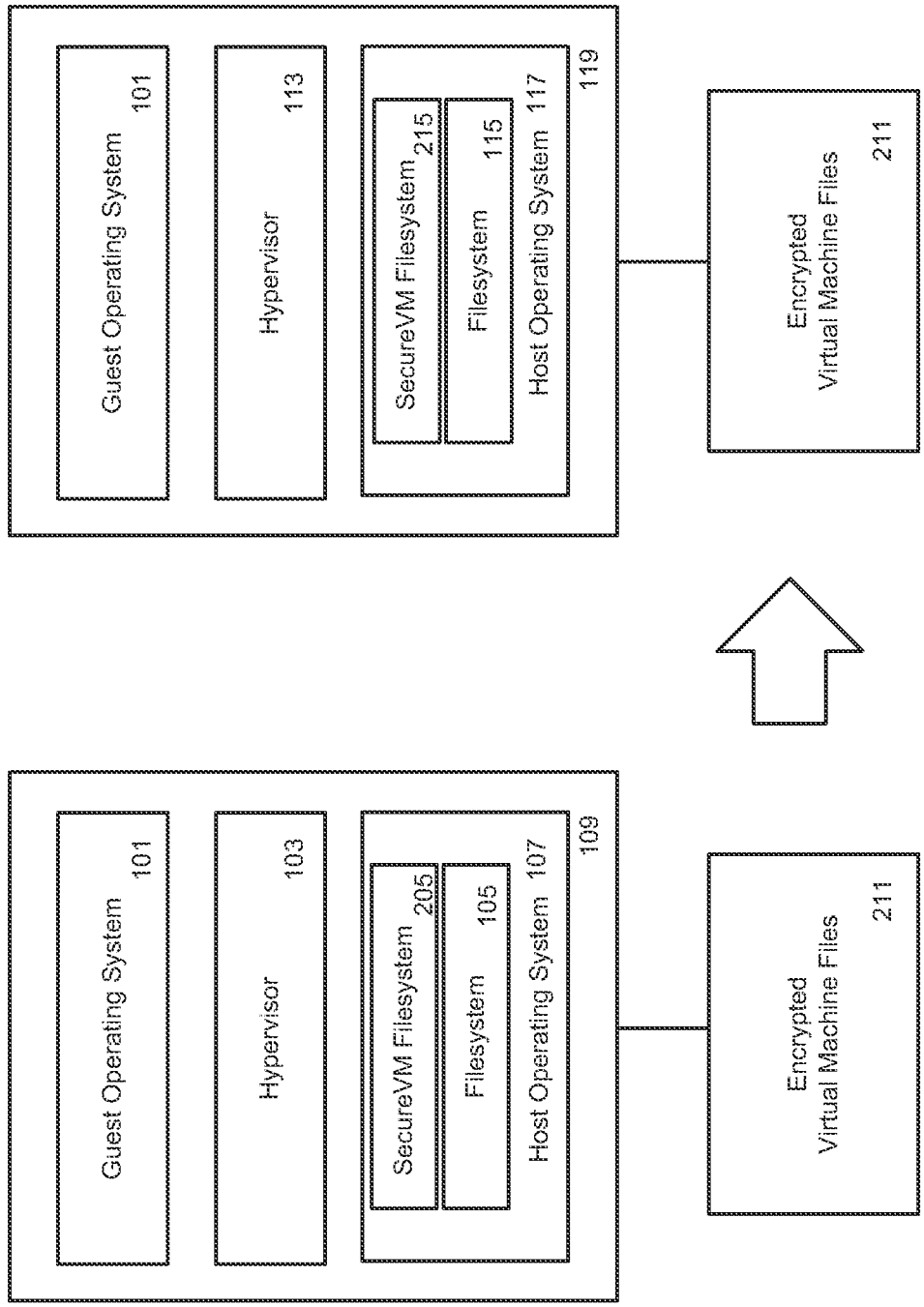
FIG. 2 is a diagram showing an example of securely moving a virtual machine from one computer to another computer according to one embodiment.

Referring now to FIG. 2, an exemplary SecureVM operating environment can be seen. On the left in the figure can be seen first computer 109 running host operating system 107 having filesystem 105. Hypervisor 103 is running on host operating system 107 to support the running of guest operating system 101 by accessing encrypted Virtual Machine files 211 through a SecureVM filesystem 205 as will be explained. Shown on the right is second computer 119 running host operating system 117 having filesystem 115. When it is desired to run guest operating system 101 on second computer 119, after a user has successfully been authenticated as will be explained, a SecureVM filesystem 215 is installed in host operating system 117 to allow hypervisor 113 access to encrypted virtual machine files 211. Attempts by another hypervisor or application to access encrypted machine files 211 are thwarted either because SecureVM filesystem 215 will not recognize that hypervisor or application and therefore will not perform decryption of encrypted virtual machine files 211 in response to their requests or because direct access to encrypted machine files 211 will only yield encrypted files rather than unencrypted (clear-text) files. The sequence and operation of these various processes and components will be explained further.

Figure 3:
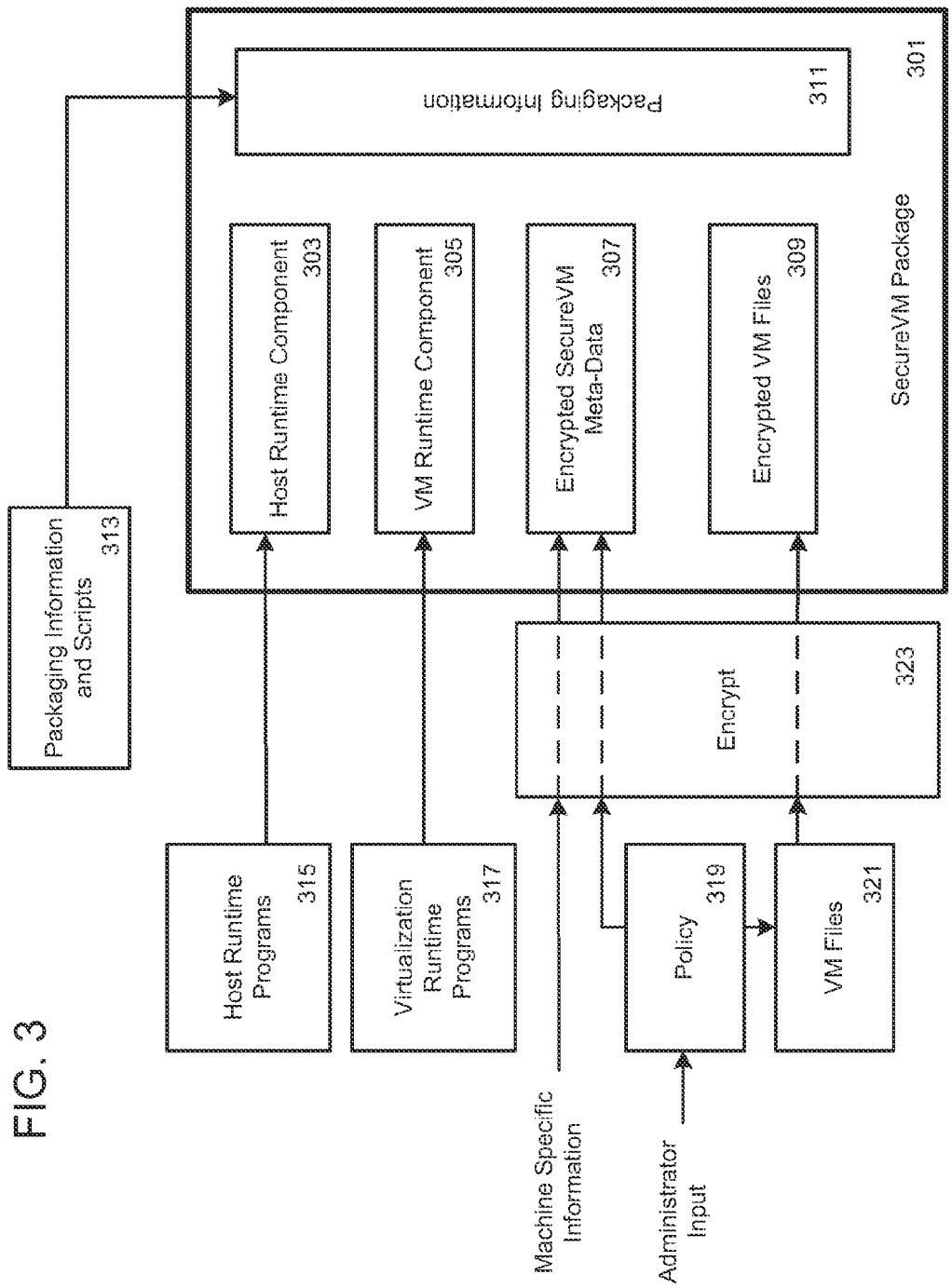
FIG. 3 is a diagram of the components of a SecureVM package and the creation thereof according to one embodiment.

Referring now to FIG. 3, a SecureVM package 301 can be seen. SecureVM package 301 is an installable software package containing the various components used to securely move, install and run a secure virtual machine as will be explained.

SecureVM package 301 includes a host runtime component 303, a VM runtime component 305, encrypted SecureVM meta-data 307, encrypted VM files 309 and packaging information 311.

The host runtime component 303 is a collection of one or more programs that handle user interaction and user authentication. The VM runtime component 305 is a specialized runtime environment including a SecureVM filesystem for an authorized hypervisor to gain access to the encrypted VM files 309 to thereby allow the virtual machine to be run. The encrypted SecureVM meta-data 307 includes encrypted information about how to authenticate a user, on which machine the VM files 309 are allowed to run, various encryption keys, etc. The encrypted VM files 309 are an encrypted copy of the virtual machine files themselves. The packaging information 311 is a set of configuration and installation scripts for installing the SecureVM package 301 on a host operating system and is typically specific to an operating system on which the SecureVM package 301 will be installed. An example of creating the SecureVM package 301 will now be explained.

A set of virtual machines files 321 are encrypted, according to a set of security policies 319 typically maintained by a security administrator, by a set of encryption algorithms 323 and stored in the SecureVM package 301 as the encrypted VM files 309. Also according to these security policies 319, the keys used by encryption block 323 to encrypt the encrypted VM files 309 are themselves encrypted by encryption block 323 and are stored in encrypted SecureVM meta-data 307. In various embodiments, information designating which user(s), machine(s), operating system(s) and hypervisor(s) the encrypted VM files 309 are allowed to run on is also encrypted by encryption block 323 in accordance with the security policies 319 and this encrypted information is stored in encrypted SecureVM meta-data 307. Other items which may be encrypted and stored in encrypted SecureVM meta-data 307 include user authentication policy details as explained elsewhere herein. Host runtime programs 315 are stored as the host runtime component 303, virtualization runtime programs are stored as the VM runtime component 305 and the packaging information installation and configuration scripts 313 appropriate to the intended guest operating system(s) are stored as the packaging information 311 in the SecureVM package 301.

When the SecureVM package 301 is installed on a computer, the different components of the package are placed in different directories according to the packaging information 311. Although dependent upon the operating system on which the SecureVM package 301 will be installed, the following is an example showing the layout of various components of the SecureVM package 301 once stored on a Linux operating system:

/usr/local/bin
    The location of the one or more programs (sometimes referred to herein as a "main program") and other parts of the host runtime component 303.

/opt/HC/SecureVM/runtime
    Runtime components that are used by all secure virtual machines including an operating system filter driver as will be explained.
/opt/HC/SecureVM/encrypted
    The location where the encrypted VM files 309 are stored. There is one directory for each secure virtual machine installed on the machine.
/opt/HC/SecureVM/encrypted/VM1/vmfiles
    The encrypted VM files 309 for a secure virtual machine called "VM1".
/opt/HC/SecureVM/encrypted/VM1/runtime
    The VM runtime component 305 for "VM1" including one or more programs specific to the virtual machine in question.
/opt/HC/SecureVM/encrypted/VM1/hc_config
    The encrypted SecureVM meta-data 307 for "VM1."
/opt/HC/SecureVM/authorized
    The directory through which authorized virtual machines can be accessed. For each secure virtual machine stored in the "encrypted" directory, there will be an empty directory of the same name in the "authorized" directory as explained elsewhere herein.

It is to be understood that users are not expected to understand the locations and layouts of the various files that comprise a virtual machine. Instead, a user need simply install the SecureVM package 301 on a machine, start the main program and then interact with a user interface to select and authenticate against the protected virtual machine, as will now be explained.

Figure 4:
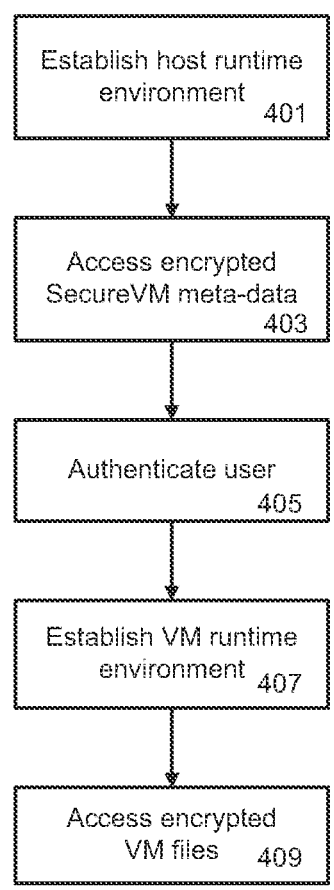
FIG. 4 is a process flow diagram of securely installing and running a secure virtual machine according to one embodiment.

Referring now to FIG. 4, the SecureVM package 301 is installed on a machine (e.g., computer 119 of FIG. 2) on which the virtual machine is intended to be run which establishes a host runtime environment in step 401 using host runtime component 303 of SecureVM package 301. This causes a software program of the host runtime, located in the directory /usr/local/bin/securevm in the above Linux example, to run. This software program locates any SecureVM images stored from the SecureVM package 301 onto the computer, located at /opt/HC/SecureVM/encrypted in the above Linux example, and presents a list of those found to the user either through a command line interface or a graphical user interface, as desired. The process continues once the software program receives a user selection of which SecureVM (e.g., the encrypted virtual machine files 309) the user desires to access.

However, before a SecureVM can be accessed, the user must first be authenticated according to the stored security policy in the encrypted SecureVM meta-data 307 of the SecureVM package 301. Accessing the encrypted SecureVM meta-data 307 requires access to the correct encryption key in order to decrypt its contents. This key is referred to herein as the SecureVM meta-data key ("SVM key"). In one embodiment, when creating the SecureVM package 301, the security administrator chooses one of two methods by which the SVM key may be accessed based on the desired level of security.

Figure 1:
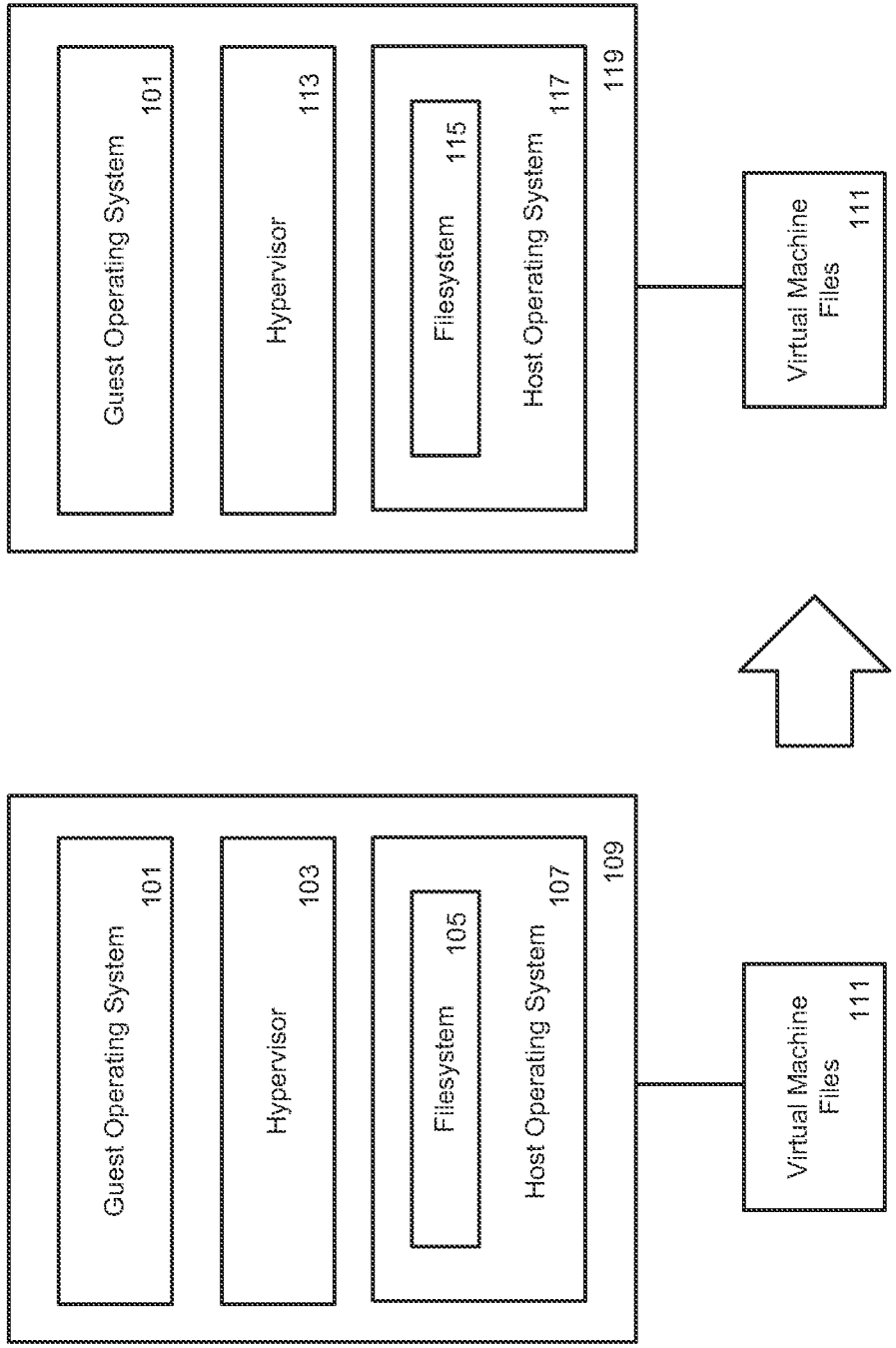
FIG. 1 is a diagram showing an example of insecurely moving a virtual machine from one computer to another computer as typically occurs in the prior art.

If the security administrator wanted a highly secure method of access to the SVM key then the security policy is set to require the SVM key be obtained over the internet. In one embodiment, obtaining the SVM key over the internet requires setting up a Secure Socket Layer ("SSL") channel between the computer on which the SecureVM package is installed (e.g., computer 119 of FIG. 1) and a remote server accessible over the internet. The SVM key is thereby returned to the software program running in the host environment on the computer on which the SecureVM package is installed.

Alternatively, if the security administrator wanted a minimally secure method of access to the SVM key then the security policy is set for the software program to instead simply look within itself for the SVM key which in one embodiment was randomly embedded in a data segment of the software program thus making it difficult for hackers to determine where the SVM key is located and how to reconstruct it.

Having now obtained the SVM key, the process of FIG. 4 continues with step 403 of accessing the encrypted SecureVM meta-data 307 to determine how to authenticate the user in order to access the encrypted virtual machine. In one embodiment, there are three possible user authentication approaches which may be used.

In the first approach, the user is prompted for a username and password which must match that stored in the encrypted SecureVM meta-data 307. In the second approach, establishing an SSL channel to a remote server (either the same server as in step 403 or a different server as may be desired, which servers may be controlled by the same or different organizations) is required. In a third approach, a user is required to provide a hardware token which must match that stored in the encrypted SecureVM meta-data 307.

Therefore, in one embodiment, using any of these approaches either singly or in combination, in step 405 the user of the computer on which the SecureVM package 301 is installed is authenticated.

Once the user is authenticated in step 405, a VM runtime environment is established in step 407 using the VM runtime component 305 of the SecureVM package 301. Establishing the VM runtime environment includes insertion of a host operating system specific filesystem, referred to herein as a SecureVM filesystem, into the host operating system. Examples of this inserted SecureVM filesystem, known as a filter driver in Microsoft Windows terminology and as a pseudo filesystem in UNIX terminology, are the SecureVM filesystem 205 of computer 109 and the SecureVM filesystem 215 of computer 119 of FIG. 2.

The SecureVM filesystem, once inserted into the host operating system, layers on top of the existing filesystem of the host operating system and performs encryption and decryption operations when the encrypted VM files 309 are read from or written to, or when other portions of the encrypted SecureVM meta-data 307 are accessed, as will be explained.

Having now authenticated the user in step 405 and establishing the VM runtime environment, including insertion of the SecureVM filesystem, in step 407 the software program can now access a Virtual Machine File Wrapping Key ("VMFW key") which is the key that was used to encrypt a Virtual Machine Key ("VM key") which itself is a key that was used to encrypt the virtual machine files to create the encrypted VM files 309 all as part of creation of the SecureVM package 301. Thus, the VMFW key is a key that can be used to unwrap (decrypt) the encrypted VM key and the VM key is a key that can be used to unwrap (decrypt) the encrypted VM files 309.

In one embodiment, the VMFW key and the VM key were each encrypted and stored in the encrypted SecureVM meta-data 307, as part of creating the SecureVM package 301 in an eXtended Markup Language (XML) format in, e.g., the file vmfile_encryption_keys.xml in the above Linux example.

Having access to the VM keys means that the VM runtime environment is now set to allow the hypervisor to access the virtual machine files in step 409 for typical virtual machine operation as will be explained.

It is to be understood that if an unauthorized user were to look at the files that comprise the SecureVM package 301, many of them would neither be recognizable as virtualization machine files nor readable because they are encrypted. However, the SecureVM filesystem can be used to address this as will now be explained. Again using the above Linux example, the encrypted files can be accessed via the path /opt/HC/SecureVM/encrypted/vm while the clear-text (unencrypted) files can be accessed via the path /opt/HC/SecureVM/authorized/vm. The mapping between these two paths is achieved via an operation known in the art, which operation differs slightly depending upon which host operating system platform is being used. As an example, consider the following command line operations using Linux as the host operating system:
insmod securevmfs
mount_securevmfs /opt/HC/SecureVM/encrypted/vm /opt/HC/SecureVM/authorized/vm where the first command "loads" the SecureVM filesystem module into the Linux kernel and the second operation "mounts" the SecureVM filesystem. This combination of operations thus builds a relationship between the two pathnames such that any access to files within the "authorized" directory will go through SecureVM filesystem which then accesses the real files through the "encrypted" directory by issuing requests to the base Linux filesystem on which the actual virtual machine files (the encrypted VM files 309) are stored. Since the SecureVM filesystem intercepts these requests, it is able to perform decryption in response to read requests from the hypervisor and is able to perform encryption in response to write requests. Following decryption or encryption, the reads and writes are passed to the base Linux filesystem that then reads or writes to the actual files on disk.

In this way, referring again to FIG. 2 as an example, hypervisor 113 running guest operating system 101 can communicate with the encrypted virtual machine files 211 in a typical fashion yet security of the encrypted virtual machine files 211 is maintained. However, attempts by any unauthorized hypervisor or other application to read the stored encrypted virtual machine files 211 will only yield access to encrypted files thus maintaining their security.

Further, despite the underlying complexity of establishing the host runtime environment, authenticating the user, establishing the VM runtime environment and maintaining the security of the encrypted VM files, all this complexity is hidden from the user. From the time the process is initiated to the time that the virtual machine can be accessed is on or the order of a few seconds and has minimal user interaction.

As has been explained, the authentication process keeps the virtual machine secure and therefore access to the unencrypted virtual machine is only available for the time that the physical machine is up and running. If the machine is rebooted, the VM runtime environment is no longer available and the user must once again complete the authentication process.

This approach has the further benefit of overcoming a flaw in VMware products that can otherwise easily be exploited. In operation, VMware virtual machine files typically include a .vmx file containing configuration information, a .vmdk file representing a disk and a .vmem file containing a memory image of the guest operating system. When the guest operating system is running the memory contents are written to the .vmem file which is stored on disk. If encryption is used in the guest operating system and the encryption keys are in active use, they are written to the .vmem file together with the rest of the guest operating system's memory. As is known, encryption keys are often easily visible due to the fact that they are very random and occupy a fixed size number of consecutive bytes in memory (typically 16 or 32 bytes depending on the encryption key size) thus making it easy for someone to scan memory to locate them. Therefore, a user able to access the host operating system can locate the .vmem file inside the directory where the virtual machine is stored and scan the .vmem file to locate the encryption keys.

This presents a problem to any encryption solution used in the guest operating system. Oracle Corporation of Redwood Shores, Calif. ("Oracle") Transparent Data Encryption ("TDE") often stores its encryption key in a password wrapped (encrypted) file on disk on the same machine as the encrypted database (Oracle calls this file a "wallet"). As explained above, not only is the wallet itself easily hackable if a virtual machine is stolen, if a snapshot of the virtual machine is stolen, the wallet is rendered useless since the actual encryption keys can be easily read from the .vmem file.

However, the present approach prevents this because of the position at which the SecureVM filesystem filter sits on the operating system kernel which allows for the .vmem file to be encrypted in addition to other virtual machine files. Unauthorized attempts to access the files in an unencrypted form will be blocked by the SecureVM filesystem and attempts to communicate directly with the host operating system filesystem will only yield access to the encrypted form of the files.

It is to be understood that various alternatives, extensions and additions can be included in various embodiments as described herein. For example, in one embodiment, various components and/or programs such as host runtime component 303 and/or VM runtime component 305 are checksummed to prevent tampering as are authorized host operating systems and their versions.

In another example, the remote server(s) can also check to see if the security policy is still valid or in effect. In this way, if there is a major security alert such as a malicious virus, the next time an attempt is made to start a virtual machine, even by the correct user with the correct credentials, the authentication policy could be overridden thus preventing establishment of the VM runtime environment thereby preventing the further spread of the virus. Further, such remote server(s) in conjunction with the security policy can also include features and capabilities as reporting, tracking and auditing any access, authentication activities, usage, etc., and key shredding, as may be desired.

In another example, some portions of the SecureVM package can be hashed to avoid having them stored in clear-text form. Example portions include a username and password. Likewise, a security policy could require a username be validated through Microsoft's Active Directory (AD) or another Lightweight Directory Access Protocol (LDAP) server.

In still another example, unique information about the machine on which a secure virtual machine will be allowed to run is stored in the encrypted SecureVM meta-data portion of the SecureVM package. For example, a Globally Unique Identifier (GUID) can be generated based on a combination of one or more of the following unique pieces of machine information: a network Media Access Control (MAC) address, a machine serial number, a hard disk drive serial number, etc. Such GUID can then be used to authenticate a machine before allowing it to establish the VM runtime environment in much the same way that a user can be authenticated.

In yet another example, in one embodiment the encryption and decryption operations described herein are based on a cryptographic software stack that is based on the OpenBSD Cryptographic Framework (OCF). Additionally, such operations can use any available hardware cryptographic support that is available to the machine on which the secure virtual machine is to be run, including the machine's microprocessor, support chipset or a cryptographic card that has been added to the machine.

It is to be understood that such terms as module, program, computer program and software program are to be read broadly and are not to be limited to standalone modules or programs and, instead, can be any portion of executable code.

It is also to be understood that the term security administrator can be any person or user with proper authority to make such security determinations.

It is still further to be understood that the SecureVM package can be stored on a portable, non-transitory computer readable medium, such as an optical disk or thumb drive among many such possibilities, for distribution and use on another computer.

It is further to be understood that the terms computer, computer system, computing system and machine are to be read broadly as referring to any physical system including a processor and memory capable of running the virtual machine.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for securely running a virtual machine on a computer, the method comprising:

establishing a host runtime environment on the computer using a host runtime component of a secure virtual machine package, wherein the secure virtual machine package is installed on the computer before establishing the host runtime environment on the computer;

presenting to a user of the computer a choice of at least one virtual machine of the secure virtual machine package;

receiving a selection from the user of the computer of one of the at least one virtual machine of the secure virtual machine package;

accessing encrypted meta-data from the secure virtual machine package to obtain a security policy, wherein accessing the encrypted meta-data from the secure virtual machine package to obtain the security policy comprises the computer communicating with a remote server to obtain a key to decrypt the encrypted meta-data;

authenticating the user of the computer according to the obtained security policy;

subsequent to authenticating the user of the computer, establishing a virtual machine runtime environment on the computer including inserting a secure filesystem into a host operating system of the computer; and accessing encrypted virtual machine files of the user selected virtual machine of the secure virtual machine package via the secure filesystem for an authorized hypervisor of the host operating system.

2. The method of claim 1, wherein presenting to a user of the computer a choice of at least one virtual machine of the secure virtual machine package comprises displaying a list on a graphical user interface of the computer.

3. The method of claim 1, wherein authenticating the user of the computer according to the obtained security policy comprises receiving a username and password from the user of the computer and comparing the received username and password to a stored username and password from the secure virtual machine package.

4. The method of claim 1, wherein authenticating the user of the computer according to the obtained security policy comprises establishing communication with a remote server.

5. The method of claim 1, wherein authenticating the user of the computer according to the obtained security policy comprises receiving a hardware token from the user of the computer and comparing the received hardware token to a stored token from the secure virtual machine package.

6. The method of claim 1, wherein establishing a virtual machine runtime environment on the computer including inserting a secure filesystem into a host operating system of the computer includes inserting a filter driver into a kernel of the host operating system.

7. The method of claim 1, wherein accessing encrypted virtual machine files of the user selected virtual machine of the secure virtual machine package via the secure filesystem for an authorized hypervisor of the host operating system comprises the secure filesystem intercepting read requests from the authorized hypervisor to a regular file system of the host operating system and performing decryption of the secure virtual machine files in response to the intercepted read requests from the authorized hypervisor.

8. The method of claim 1, wherein accessing encrypted virtual machine files of the user selected virtual machine of the secure virtual machine package via the secure filesystem for an authorized hypervisor of the host operating system comprises the secure filesystem intercepting write requests from the authorized hypervisor to a regular file system of the host operating system and performing encryption of a modified form of the secure virtual machine files in response to the intercepted write requests from the authorized hypervisor.

9. A non-transitory computer readable medium containing programming code executable by a processor, the programming code configured to perform a method comprising:

establishing a host runtime environment on the computer using a host runtime component of a secure virtual machine package, wherein the secure virtual machine package is installed on the computer before establishing the host runtime environment on the computer;

presenting to a user of the computer a choice of at least one virtual machine of the secure virtual machine package;

receiving a selection from the user of the computer of one of the at least one virtual machine of the secure virtual machine package;

accessing encrypted meta-data from the secure virtual machine package to obtain a security policy, wherein accessing the encrypted meta-data from the secure virtual machine package to obtain the security policy comprises the computer communicating with a remote server to obtain a key to decrypt the encrypted meta-data;

authenticating the user of the computer according to the obtained security policy;

subsequent to authenticating the user of the computer, establishing a virtual machine runtime environment on the computer including inserting a secure filesystem into a host operating system of the computer; and accessing encrypted virtual machine files of the user selected virtual machine of the secure virtual machine package via the secure filesystem for an authorized hypervisor of the host operating system.

* * * * *